United States Patent
Yabe et al.

(10) Patent No.: US 7,640,321 B2
(45) Date of Patent: Dec. 29, 2009

(54) ELECTRONIC MAIL DELIVERY SYSTEM, MAIL SERVER, AND MAIL CLIENT

(75) Inventors: Toshiyasu Yabe, Yokohama (JP); Makoto Soga, Tokyo (JP); Tomoko Enatsu, Yokohama (JP)

(73) Assignee: NTT DoCoMo, Inc., Tokyo (JP)

( * ) Notice: Subject to any disclaimer, the term of this patent is extended or adjusted under 35 U.S.C. 154(b) by 340 days.

(21) Appl. No.: 10/519,199

(22) PCT Filed: Jun. 17, 2003

(86) PCT No.: PCT/JP03/07663

§ 371 (c)(1),
(2), (4) Date: Dec. 17, 2004

(87) PCT Pub. No.: WO04/001612

PCT Pub. Date: Dec. 31, 2003

(65) Prior Publication Data

US 2006/0015559 A1    Jan. 19, 2006

(30) Foreign Application Priority Data

Jun. 19, 2002   (JP) .................. 2002-178535

(51) Int. Cl.
G06F 15/16 (2006.01)
G06F 3/00 (2006.01)
(52) U.S. Cl. .................. 709/219; 709/212; 715/752
(58) Field of Classification Search .................. 715/752
See application file for complete search history.

(56) References Cited

U.S. PATENT DOCUMENTS 6,505,237 B2 * 1/2003 Beyda et al. ................. 709/206
6,661,877 B1 * 12/2003 Lee et al. .................... 379/67.1
2002/0169670 A1 * 11/2002 Barsade et al. ................ 705/14

FOREIGN PATENT DOCUMENTS

| JP | H11-203216 A | 7/1999 |
| JP | 2000-222301 A | 8/2000 |
| JP | 2002-135292 A | 5/2002 |

OTHER PUBLICATIONS

De Mendonca Kieth et al., WO 03/003263 A2, e-Mail Manager Program for a Wirless Information Device, Jan. 9, 2003.*

* cited by examiner

*Primary Examiner*—Ashok B Patel
(74) *Attorney, Agent, or Firm*—Brinks Hofer Gilson & Lione

(57) ABSTRACT

Mobile device MS displays an unreceived mail list acquired from gateway server GWS by executing a browser. A user selects a desired e-mail by referring to the unreceived mail list. Prior to that gateway server GWS transmits e-mails to mobile device MS, gateway server GWS transmits to mobile device MS, an HTML header including predetermined character strings which are a field name (X-IMTMAIL) and a field value (WEB). Then, mobile device MS activates a mailer, and prepares to receive and store e-mails transmitted from gateway server GWS.

11 Claims, 12 Drawing Sheets

```
HTTP/1.1 200 OK CRLF
X-IMTMAIL: WEB CRLF
X-D: 200210051000 CRLF
X-EID: 0001/0003 CRLF
X-S: YESTERDAY'S MATTER CRLF
X-F: abc@mpn.co.jp CRLF
MIME-Version: 1.0 CRLF
Content-Type: multipart/mixed, boundary="mimeboundarymarker"
CRLF
Content-Length: XXXX CRLF
CRLF

<HEREAFTER, THE BODY OF AN E-MAIL (MAIL ID:0001)>
```

```
HTTP/1.1 200 OK CRLF
X-IMTMAIL: WEB CRLF
CRLF

<HEREAFTER, REQUEST ACCEPTING COMPLETION PAGE>
(<META HTTP-EQUIV="Refresh"URL=mpn.co.jp/imt.cgi?">INCLUDE)
```

SELECTIVE RECEPTION ACCEPTED

```
GET HTTP://mpn.co.jp/imt.cgi? HTTP/1.1 CRLF
User-Agent: XXXXXXX CRLF
X-EID: 0000 CRLF
CRLF
```

FIG. 12

```
HTTP/1.1 200 OK CRLF
X-IMTMAIL: WEB CRLF
X-D: 200210051000 CRLF
X-EID: 0001/0003 CRLF
X-S: YESTERDAY'S MATTER CRLF
X-F: abc@mpn.co.jp CRLF
MIME-Version: 1.0 CRLF
Content-Type: multipart/mixed,boundary="mimeboundarymarker"
CRLF
Content-Length: XXXX CRLF
CRLF

<HEREAFTER, THE BODY OF AN E-MAIL (MAIL ID:0001)>
```

FIG. 13

```
GET HTTP://mpn.co.jp/imt.cgi? HTTP/1.1 CRLF
User-Agent: XXXXXXX CRLF
X-EID: 0001/0003 CRLF
CRLF
```

FIG. 14

```
HTTP/1.1 200 OK CRLF
X-IMTMAIL: WEB CRLF
X-D: 200210051001 CRLF
X-EID: 0003/EIEOF CRLF
X-S: NEWS (RESEND) CRLF
X-F: abc@mpn.co.jp CRLF
MIME-Version: 1.0 CRLF
Content-Type: multipart/mixed,boundary="mimeboundarymarker"
CRLF
Content-Length: XXXX CRLF
CRLF

<HEREAFTER, THE BODY OF AN E-MAIL (MAIL ID:0003)>
```

*FIG. 15*

```
GET HTTP://mpn.co.jp/imt.cgi? HTTP/1.1 CRLF
User-Agent: XXXXXXX CRLF
X-EID: 0003/E1E0F CRLF
CRLF
```

*FIG. 16*

```
HTTP/1.1 251 Fin CRLF
X-EID: 0000/0000 CRLF
CRLF
```

*FIG. 17*

MAIL RECEIVED.
DISPLAY THE MAIL NOW?

| YES | NO |

FIG. 19

UNRECEIVED MAIL LIST

PM1 — ○ [RECEIVE]   ☐YESTERDAY'S MATTER
　　　　　　　　　　　　def@xyz.co.jp
　　　　　　　　　　　　2002/10/1

PM2 — ○ [SUSPEND]   ☐NEWS
　　　　　　　　　　　　ghi@opq.ne.jp
　　　　　　　　　　　　2002/10/2

PM3 — ○ [DELETE]    ☐NEWS (RESEND)
　　　　　　[RECEIVE]　ghi@opq.ne.jp
　　　　　　[DELETE]　　2002/10/3
　　　　　　[SUSPEND]

[NEXT PAGE]      [OK]

FIG. 20

UNRECEIVED MAIL LIST

○ [RECEIVE]   ☐NEWS
　　　　　　　　ghi@opq.ne.jp
　　　　　　　　2002/10/2

[NEXT PAGE]      [OK]

ELECTRONIC MAIL DELIVERY SYSTEM, MAIL SERVER, AND MAIL CLIENT

TECHNICAL FIELD

The present invention relates to techniques for delivering e-mails from a mail server to a mail client such as a mobile device.

BACKGROUND ART

Recently, a type of mobile device which functions as a mail client capable of sending and receiving e-mails has come into widespread use. This type of mobile device runs a mailer to perform the following processes.

First, when a mail server receives an e-mail to be sent to a mobile device, the server temporarily stores the e-mail in a storage area commonly referred to as "a mail box". The server then calls the destination mobile device via a mobile communication network. In response to the call from the server, the mobile device executes a mailer and transmits a response to the call. When the mail server receives the response from the mobile device, it reads the e-mail from the mail box and sends the e-mail to the mobile device via the mobile communication network. The mobile device stores the received e-mail in a non-volatile memory by using a function of the mailer; and in response to a user's instruction, the mobile device opens and displays the e-mail.

In recent years, an increasing number of junk e-mails sent from unknown third-parties for advertising purposes has become a serious problem for mobile device users. The problem is compounded by the fact that mobile device users are obliged to pay communication charges for receiving such e-mails. This problem is caused by the current delivery system in which, when a mobile device responds to a call from a mobile communication network (that is to say, when a mobile device is located in a service area of a mobile communication network), an e-mail is automatically delivered to a mobile device without the consent of a user.

The above problem may be solved using the method described below.

A mail server displays to a user only attribute information of each e-mail, without the body of the message (e.g. the title or the sender of each e-mail) in a list format listing e-mails stored in a mail box. Referring to the list, the user selects only e-mails that he/she desires to receive and the user's mobile device notifies the selection to the mail server. In response to the selection, the mail server sends to a mobile device only those e-mails selected by the user; thus, a user is able to acquire only desired e-mails.

To use the above-described method, many types of mobile devices are provided with a program suitable for browsing documents (hereinafter referred to as a "browser"). By this configuration, a mobile device is not required to install a program for viewing a list in a memory, which is advantageous from a view of development costs of mobile devices or the efficient use of a memory.

However, currently available browsers display only image data on the basis of data received from outside. This implies that when an e-mail is converted into HTML data and a mobile device receives the data, the mobile device is able to display HTML data in a browser, but the device cannot determine whether the HTML data is an e-mail. In other words, a mobile device is able to interpret and display received HTML data on a screen, but the mobile device can not identify whether received HTML data was originally an e-mail, nor can it store the selected data in a nonvolatile memory as an e-mail. Therefore, user operations including designation of a storing location or a filename and input of a storing command are necessary when storing the received HTML data as email in a non-volatile memory. As explained above, a browser facilitates the process of browsing a list and receiving and displaying e-mails; however, a problem exists that a browser is not capable of efficiently storing received e-mails in a nonvolatile memory.

The present invention has been presented in view of the above background, and has as its object the provision of a mechanism for delivering e-mails from a mail server to a mail-client, and having the mail client store e-mails by using a document browsing program (e.g. a browser in a mail client) and an e-mail processing program for processing e-mails.

SUMMARY OF THE INVENTION

To solve the above problem, the present invention provides an e-mail processing method comprising: sending, from a mail server for performing a mail delivery process to mail clients, mail attribute information indicating an attribute of an e-mail for the mail client in a data format, the data format enabling the mail client to display the mail attribute information by executing a document browsing program; receiving, in the mail client, mail attribute information transmitted from the mail server, and displaying the received mail attribute information in accordance with the document browsing program; accepting, in the mail client, an operation to select an e-mail selected by a user from among e-mails corresponding to the displayed mail attribute information; sending from the mail client to the mail server, identification information for identifying an e-mail selected by the user; receiving in the mail server, identification information transmitted from the mail client, and sending to the mail client, predetermined character strings for instructing the mail client to process data transmitted from the mail server to the mail client in accordance with an e-mail processing program, prior to or along with sending an e-mail specified by the identification information; and when receiving predetermined character strings transmitted from predetermined character strings, storing, in accordance with an e-mail processing program by the mail client in a nonvolatile memory, an e-mail transmitted from the mail server.

The e-mail processing method enables a mail client to display mail attribute information of an e-mail by following the processes written in the document browsing program; thus, a user is able to select only a desired e-mail from among emails corresponding to mail attribute information. Then, a mail server transmits predetermined character strings to the mail client program prior to transmitting a selected e-mail, or along with the transmission of a selected e-mail. When receiving predetermined character strings, a mail client executes an e-mail processing program, and stores in a non-volatile memory an e-mail transmitted from the mail server by following the processes written in the e-mail processing program.

In the preferred embodiment, the mail server and the mail client mutually send and receive data in accordance with a hyper text transfer protocol; and the predetermined character strings may be written in a header of a hyper text transfer protocol.

In the preferred embodiment, the mail server and the mail client mutually send and receive data in accordance with a hyper text transfer protocol; and the mail client, in the step of sending identification information, may send to the mail server identification information for specifying the selected e-mail by using a POST method of a hyper text transfer protocol.

In the preferred embodiment, the mail server and the mail client mutually send and receive data in accordance with a hyper text transfer protocol; and when the mail server sends to the mail client the predetermined character strings prior to sending an e-mail identified by the identification information, the mail client may request the mail server to transmit the e-mail by transmitting a request to the mail server, the request using a GET method of a hyper text transfer protocol.

In the preferred embodiment, when sending the e-mail to the mail client, the mail server writes in a header of a hyper text transfer protocol in a predetermined order identification information for identifying an e-mail to be transmitted this time, and identification information for identifying an e-mail to be transmitted subsequently and transmits them to the mail client; and the mail client writes in a request header of a hyper text transfer protocol in a predetermined order, the two pieces of identification information written in a header of the received hyper text transfer protocol, and requests the mail server to send the e-mail to be subsequently transmitted by transmitting a request header of a hyper text transfer protocol to the mail server; and the mail server identifies an e-mail to be sent on the basis of the predetermined order of the two pieces of identification information in a request header of the received hyper text transfer protocol, and may send the specified e-mail to the mail client.

Further, the present invention provides a mail server which performs a mail delivering process to a mail client; the mail server comprising: an attribute information sending means for sending to the mail client mail attribute information in a displayable data format enabling the mail client to indicate the e-mail attribute information in accordance with a document browsing program, the mail attribute information indicating an e-mail attribute for the mail client; an identification information reception means for receiving identification information of an e-mail transmitted from the mail client; and a character string sending means for sending to the mail client, predetermined character strings for instructing the mail client to process data transmitted from the mail server to the mail client in accordance with an e-mail processing program, prior to or along with sending an e-mail specified by the identification information.

In one preferred embodiment, a mail server sends and receives data with the mail client in accordance with a hyper text transfer protocol; and the character string sending means sends the predetermined character strings to the mail client by writing the predetermined character strings in a header of a hyper text transfer protocol.

Further, the present invention provides a mail client, which receives e-mails from a mail server; the mail client comprising: an attribute information reception means for receiving, mail attribute information transmitted from the mail server, the mail attribute information indicating an e-mail attribute for the mail client; a display means for displaying the received mail attribute information by following the processes written in a document browsing program; an accepting means for accepting an operation to select an e-mail selected by a user from among e-mails corresponding to the displayed mail attribute information; an identification information sending means for sending from the mail client to the mail server, identification information for identifying an e-mail selected by the user; and a storing means for, upon receiving predetermined character strings transmitted from predetermined character strings, storing, in accordance with an e-mail processing program by the mail client in a nonvolatile memory, an e-mail transmitted from the mail server.

In one preferred embodiment, a mail client sends and receives data with the mail client in accordance with a hyper text transfer protocol; and the identification information sending means sends to the mail server identification information for specifying the selected e-mail by using a POST method of a hyper text transfer protocol.

In one preferred embodiment, the mail server and the mail client mutually send and receive data in accordance with a hyper text transfer protocol, and the mail server sends to the mail client the predetermined character strings prior to sending an e-mail identified by the identification information; the mail client comprising, requesting means for requesting the mail server to transmit the e-mail by transmitting a request to the mail server, the request using a GET method of a hyper text transfer protocol.

As described above, according to the present invention, a mail client displays the received mail attribute information in accordance with the document browsing program. When receiving predetermined character strings transmitted from predetermined character strings, the mail client, in accordance with an e-mail processing program by the mail client, stores in a nonvolatile memory an e-mail transmitted from the mail server. Consequently, along with using a document browsing program (e.g. a browser in a mail client) and an e-mail processing program for processing e-mails, e-mails are delivered from a mail server to a mail client, thereby enabling the mail client to store e-mails.

BRIEF DESCRIPTION OF THE DRAWINGS

FIG. 12 is a diagram showing the contents of a HTTP response in the operation example.

FIG. 13 is a diagram showing the contents of a HTTP request in the operation example.

FIG. 14 is a diagram showing the contents of a HTTP response in the operation example.

FIG. 15 is a diagram showing the contents of a HTTP request in the operation example.

FIG. 16 is a diagram showing the contents of a HTTP response in the operation example.

FIG. 17 is a pattern diagram explaining a screen displayed in a mobile device in the operation example.

FIG. 19 is a pattern diagram showing a screen displayed on a mobile device in one modification.

FIG. 20 is a pattern diagram showing a screen displayed on a mobile device in one modification.

PREFERRED EMBODIMENTS

Figure 1:
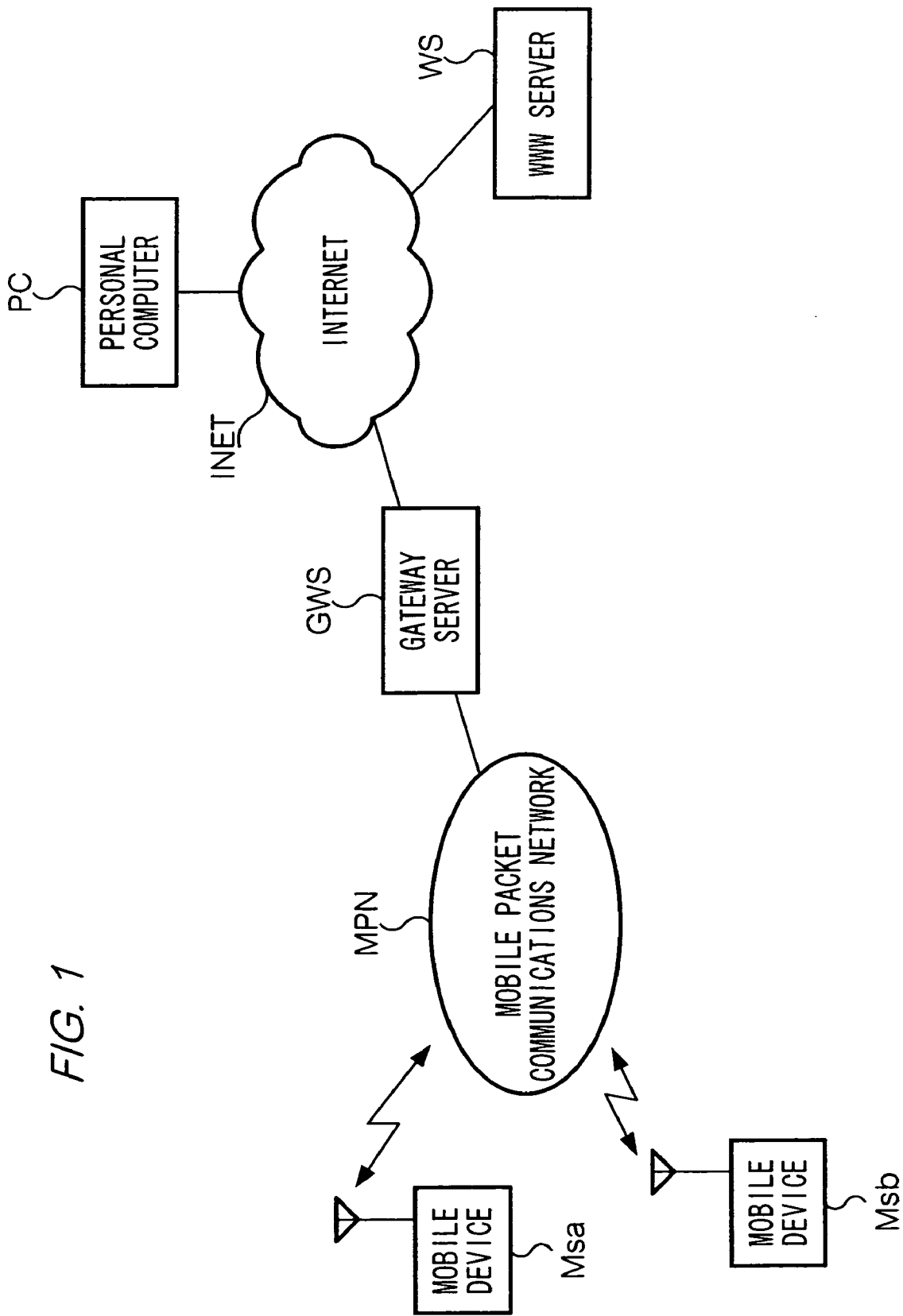
FIG. 1 is a block diagram showing the configuration of an e-mail transmission system according to one embodiment of the present invention.

Referring now to the drawings, the embodiments of the present invention will be described. The present invention is not limited to the described embodiments and further modifications are possible within the technical spirit of the invention.

A. Configuration

Referring now to the figures, an e-mail transmission system according to one embodiment of the present invention will be described; in the figures, like reference numerals denote like elements.

(1) Overall Configuration of the System

FIG. 1 is a block diagram showing the configuration of an e-mail transmission system according to one embodiment of the present invention. As shown in FIG. 1, the mail transmission system is comprised of mobile devices MSa and MSb, a mobile packet communication network MPN which provides a mobile packet communication service to mobile devices MSa and MSb, a gateway server GWS which mutually connects mobile packet communication network MPN and Internet INET, a personal computer PC and a WWW server WS connected to the Internet through a relay facility such as a router or a local network (not shown). In the mail transmission system, mobile device MSa and MSb, personal computer PC, and WWW server WS function as a mail client which sends and receives e-mails.

In FIG. 1, for simplicity of explanation, two mobile devices MSa and MSb, one personal computer PC, and one WWW server WS are shown. In actuality, however, a large number of mail clients exist. Mobile device MSa and MSb are identical in configuration and operation; therefore, mobile devices MSa and MSb will generically be referred to as "mobile device MS" except in a case that it is necessary to differentiate between them.

Mobile packet communication network MPN is comprised of base stations and switching device (not shown), and communication lines connecting them. Base stations BS are located at predetermined intervals so as to divide a ground surface into a plurality of areas each having a radius of, for example, 500 m; and each base station is capable of wireless communication with mobile device MS which is inside a radio zone formed by the base station. Switching device performs a line exchanging process in mobile packet communication network MPN.

Mobile device MS is a portable telephone of a PDC (Personal Digital Cellular) system or IMT 2000 (International Mobile Telecommunication-2000) system, a handy phone portable telephone of a PHS method (Personal Handyphone System), or a portable radio communication terminal such as a PDA (Personal Digital Assistant) having a function of performing data communication by radio.

Mobile device MS has software for browsing document data (in other words, "Browser"). The browser enables a mobile device to display a dialogue screen on the basis of data in an HTML (Hyper Text Markup Language) format (hereafter referred to as "HTML data") provided from gateway server GWS or WWW server WS through mobile packet communication network MPN. Further, mobile device MS has a mailer for sending and receiving e-mails. The mailer enables mobile device MS to send e-mails to and receive e-mails from personal computer PC or WWW server WS through mobile packet communication network MPN and Internet INET, or to send e-mails to and receive e-mails from other mobile devices MS (mobile device MSb in the case of mobile device MSa) through mobile packet communication network MPN.

Mail clients such as mobile device MS, personal computer PC and WWW server WS do not send e-mails to or receive e-mails from each other directly; instead, they send and receive e-mails via mail servers responsible for performing e-mail delivering processes for each mail client. Gateway server GWS in FIG. 1 is a mail server dedicated to delivering e-mails for mobile device MS. It should be noted that no figure is shown denoting a mail server dedicated to delivering e-mails for personal computer PC or WWW server WS, because such a mail server is the same as a typical mail server.

Personal computer PC has a mailer which supports SMTP (Simple Mail Transfer Protocol) and POP3 (Post Office Protocol Version 3); and by executing the mailer, personal computer PC sends e-mails to and receives e-mails from mobile device MS through mobile packet communication network MPN and Internet INET.

WWW server WS stores content to be provided to a user of mobile device MS, and is provided with a WWW server application software and a mail server function that supports SMTP. WWW server WS runs WWW server application software, and thereby sends content to mobile device MS as an HTTP response for an HTTP request, content, or performs a mail server function described above, thereby sending content in an e-mail format to mobile device MS.

Gateway server GWS performs conversion of communication protocols which differs between mobile packet communication network MPN and Internet INETET. Further, gateway server GWS is provided with software for performing a mail transmission process for mobile device MS. Specifically, when receiving an e-mail for mobile device MS, gateway server GWS stores a received e-mail in a storage area called a mail box assigned to each mobile device MS, reads the received e-mail in response to a request from mobile device MS, and sends the e-mail to mobile device MS, or gateway server GWS sends an e-mail sent from mobile device MS to a mail server performing a mail transmission process for a mail client to which the e-mail is to be sent.

(2) Configuration of a Communication Protocol

A communication protocol in the mail delivery system will next be explained.

Figure 2:
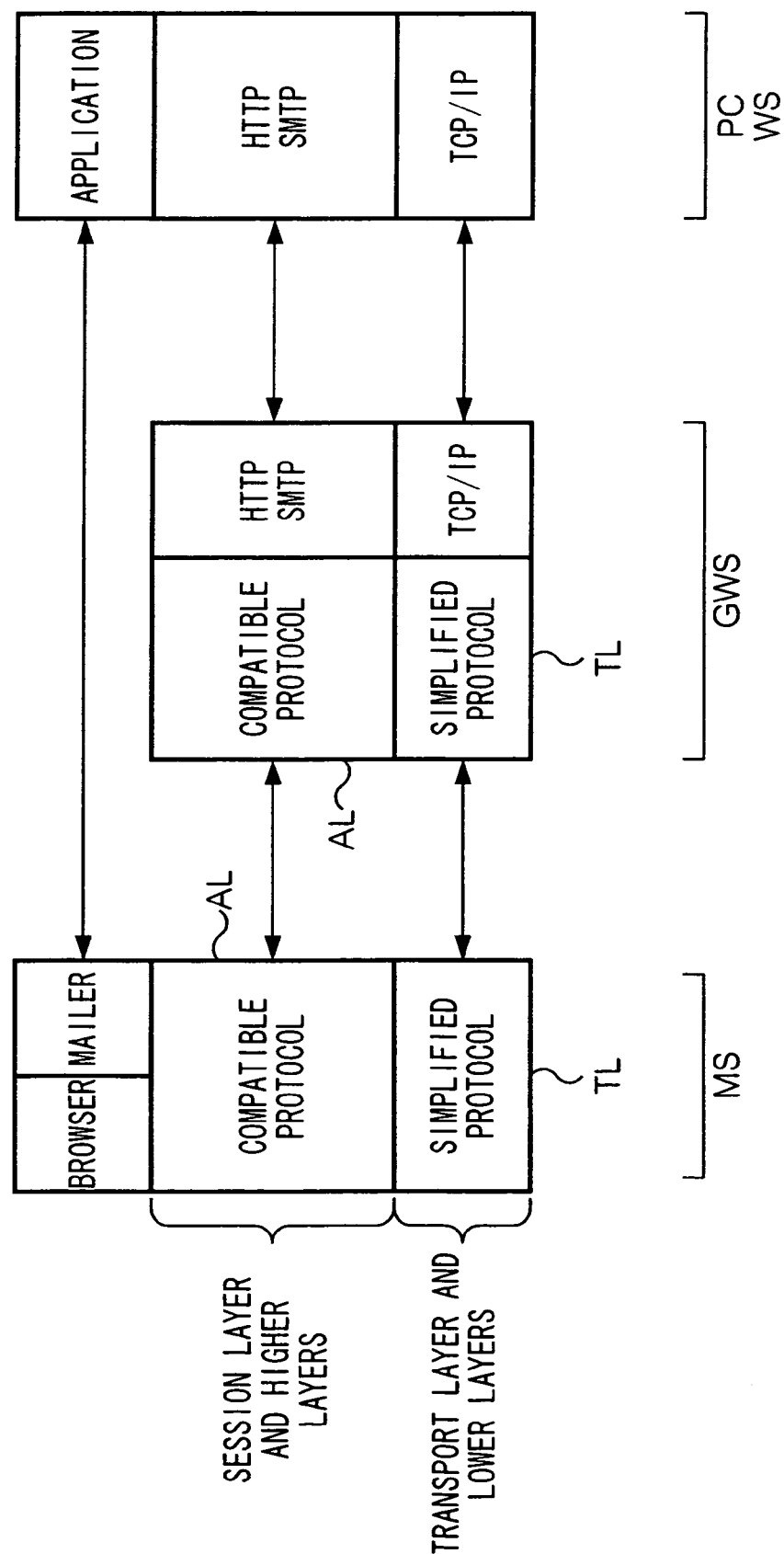
FIG. 2 is a conceptual diagram showing the configuration of a communication protocol in the system.

FIG. 2 is a conceptual diagram partially showing a layer of a communication protocol in the mail delivery system. As shown in FIG. 2, with regard to the communication between a browser or a mailer of mobile device MS and various applications included in WWW server WS, personal computer PC, or a mail server (not shown in FIG. 2), the mail server for sending e-mails to WWW server WS and Personal computer PC (hereinafter, referred to as WWW server WS), different types of communication protocols are converted at the boundary of gateway server GWS. The conversion in gateway server GWS is required because while communication protocols of a session layer and higher layers (hereafter referred to as "high layers") implemented in WWW server WS are HTTP or SMTP, and communication protocols of a transport layer, and lower layers (hereafter referred to as "low layers") implemented in WWW server WS and the like are TCP/IP (Transmission Control Protocol/Internet Protocol), a high layer communication protocol implemented in mobile device MS is a compatible protocol AL, and a low layer communication protocol is a simplified protocol TL; thus, communication protocols differs in high layers and low layers.

Compatible protocol AL is a communication protocol having compatibility with HTTP, and has every function required for typical HTTP. Further, simplified protocol TL is a communication protocol which simplifies TCP/IP. Simplified protocol TL is a communication protocol developed so as to provide a reliable transport layer only to compatible protocol AL, and a communication protocol whose functions and procedures are substantially reduced as compared with TCP/IP used by various high layer communication protocols. Simplified protocol TL is installed in mobile device MS to enable compatability with bandwidth and transmission delay of mobile packet communication network MPN, and processing capability of mobile device MS.

In FIG. 2, gateway server GWS is provided with simplified protocol TL and compatible protocol AL for communicating with mobile device MS, and TCP/IP, HTTP and SMTP for communicating with WWW server WS.

For example, in a case that mobile device MS sends and receives an e-mail via WWW server WS, gateway server GWS performs conversion between simplified protocol TL and TCP/IP, and also performs conversion between compatible protocol AL and SMTP.

Further, in case that mobile device MS acquires content stored in WWW server WS in compliance with HTTP, gateway server GWS performs conversion between simplified protocol TL and TCP/IP, both of which are communication protocols of low layers; however, the gateway server does not perform conversion between communication protocols in high layers. This is because a device implemented with compatible protocol AL, having every function of HTTP, is able to handle HTTP data.

(3) Configuration of Mobile Device MS

Figure 3:
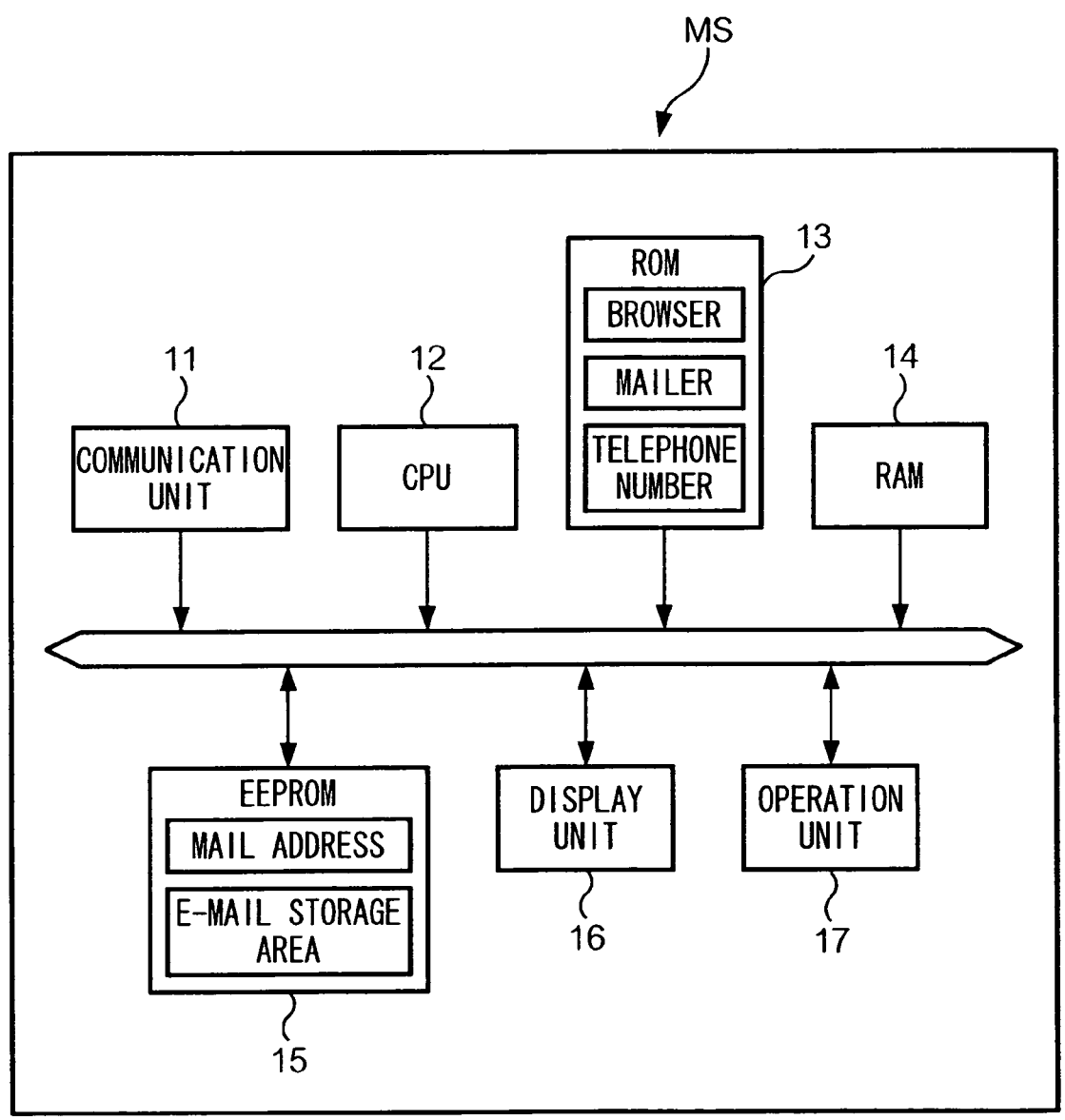
FIG. 3 is a block diagram showing the configuration of a gateway server in the system.

The configuration of mobile device MS will next be explained with reference to FIG. 3.

A communication unit 11 is comprised of an antenna or a radio transmission and reception unit, and communication unit 11 performs radio packet communication with mobile packet communication network MPN. Further, communication unit 11 is comprised of a CODEC, a microphone or a speaker for communication by which mobile device MS is able to perform communication by circuit switching through a mobile telephone network (not shown).

Telephone numbers assigned to mobile device MS, or control programs such as a browser or a mailer are stored in a ROM (Read Only Memory) 13. Processes operating on the basis of compatible protocol AL or simplified protocol TL described above is programmed in a browser or a mailer. A CPU (Central Processing Unit) 12 reads various control programs from ROM 13 and executes the programs in work area, RAM 14.

E-mail addresses assigned to mobile device MS, and a program name of a CGI (Common Gateway Interface) program (described later) of which gateway server GWS is comprised are pre-stored in an EEPROM (Electronically Erasable and Programmable Read Only Memory) 15. Also, an e-mail storage area for storing received e-mails through mobile packet communication network MPN is installed in EEPROM 15.

An operation unit 17 is comprised of various input devices such as a plurality of keypads or jog dials, and provides to CPU 12, a signal corresponding to instructions input by a user. CPU 12 executes a process corresponding to a signal provided from operation unit 17.

A display unit 16 is comprised of a liquid crystal panel and a panel driving circuit for driving the liquid crystal panel, and displays image data provided from CPU 12.

(4) Configuration of Gateway Server GWS

Figure 4:
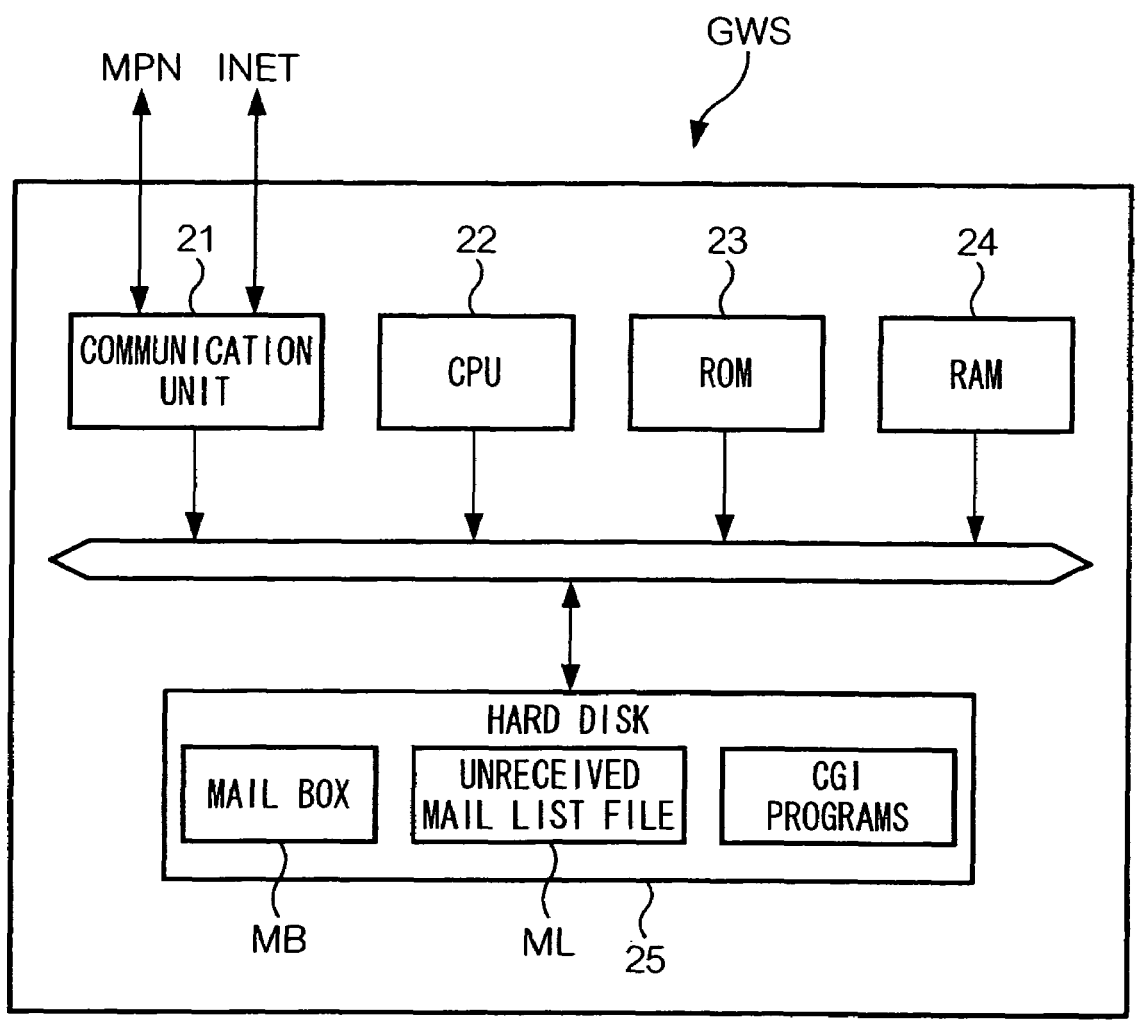
FIG. 4 is a block diagram showing the configuration of a gateway server in the system.

Next, the configuration of gateway server GWS will be described with reference to FIG. 4.

A communication unit 21 performs a packet communication with mobile packet communication network MPN, and performs a packet communication with Internet INETT.

Control programs such as IPL (Initial Program Loader) for performing basic control of each unit in gateway server GWS are stored in ROM 23. CPU 22 executes a basic control process for each unit gateway server GWS by reading out control programs. A RAM 24 is used as a work area for CPU 22, and accepts programs executed by CPU 22, or temporarily stores various data in RAM 24.

A mail box MB assigned to each mobile device MS is formed in hard disk 25. Further, an unreceived mail list file ML configured by attribute information of an e-mail stored in mail box MB, CGI programs for performing transmission and reception of e-mails with mobile device MS, or various HTML files (not shown in FIG. 4) such as a menu page to be displayed on mobile device MS are stored in hard disk 25.

Next, the unreceived mail list file ML will be described.

Figure 5:
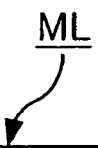
FIG. 5 is a conceptual diagram illustrating the content of a mail list stored by a gateway server in the system.

FIG. 5 is a conceptual diagram explaining the content written in unreceived mail list file ML for a mobile device (assumed to be mobile device MSa) to which a mail address [abc@mpn.co.jp] and a telephone number [09012345678] are assigned.

As shown in FIG. 5, mail data such as a sender (from), a title (subject), transmission date and time (date), for mails which mobile device MSa has not so far received, are written in unreceived mail list file ML, and the mail data correspond to each other in the file. Further, a mail ID is assigned to each e-mail not received by gateway server GWS. In the embodiment, a mail ID is assigned to each e-mail not received from an initial value (0001) in number order, and each e-mail sent to mobile device MSa is identified by using a mail ID.

Unreceived mail list file ML is generated in an HTML format for each mobile device MS. Gateway server GWS responds to an HTTP request using a GET method sent from mobile device MS, reads from hard disk 25 unreceived mail list file ML designated by a HTTP request, and transmits it to mobile device MS as an HTTP response. Then, when a desired e-mail is selected by a user from unreceived mail list file ML, mobile device MS notifies gateway server GWS by an HTTP request using a POST method by which an e-mail is selected by a user. On the other hand, gateway server GWS transmits to mobile device MS an HTTP response indicating that the above notification is received safely. Then gateway server GWS reads an e-mail selected in the above notification from hard disk 25 in compliance with a request sent from mobile device MS, and transmits to mobile device MS an HTTP response including a read email.

At this time, gateway server GWS transmits to mobile device MS, a header for an HTTP response indicating that the above notification is received safely, and a header for an HTTP response including an e-mail. In this transmission, both headers include a field name (X-IMTMAIL) and a field value (WEB), both of which are unique to the embodiment. A field name (X-IMTMAIL) and a field value (WEB) are character strings for instructing to process data sent from gateway server GWS to mobile device MS by following the processes written in a mailer in mobile device MS. When a browser in mobile device MS detects that a field name (X-IMTMAIL) and a field value (WEB) are included in a header for a received HTTP response, a browser in mobile device MS performs the process described below. That is to say, in a case that a mailer in mobile device MS is not activated when a browser in mobile device MS receives the above character strings, mobile device MS reads a mailer from ROM 13 for activation. However, in a case that a mailer in mobile device MS is activated when a browser in mobile device MS receives the above character strings, mobile device MS stores in an e-mail storage area of EEPROM 15, an e-mail included in an HTTP response including the above character strings. Thus, mobile device MS activates a mailer, and stores an e-mail in a non-volatile memory (e.g. EEPROM 15) by which a browser detects the above predetermined character strings.

Unreceived mail list file ML is updated by CPU 22 in gateway server GWS. The updating process will be described below.

For example, when gateway server GWS receives an e-mail to be transmitted to mobile device MSa, gateway server GWS allocates a new mail ID to an e-mail and stores, in mail box MB corresponding to mobile device MSa, the e-mail to which the new mail ID is given. Then, gateway server GWS extracts attribute information of the e-mail, and adds it to unreceived mail list file ML. Also, in a case that gateway server GWS transmits to mobile device MSa an e-mail read from mail box MB, gateway server GWS deletes the e-mail read from mail box MB, and deletes attribute information of the transmitted e-mail from mail box MB.

B. Operation

Next, an example of an operation will be described by which mobile device MSa receives an e-mail in the system configured as described above.

Figure 6:
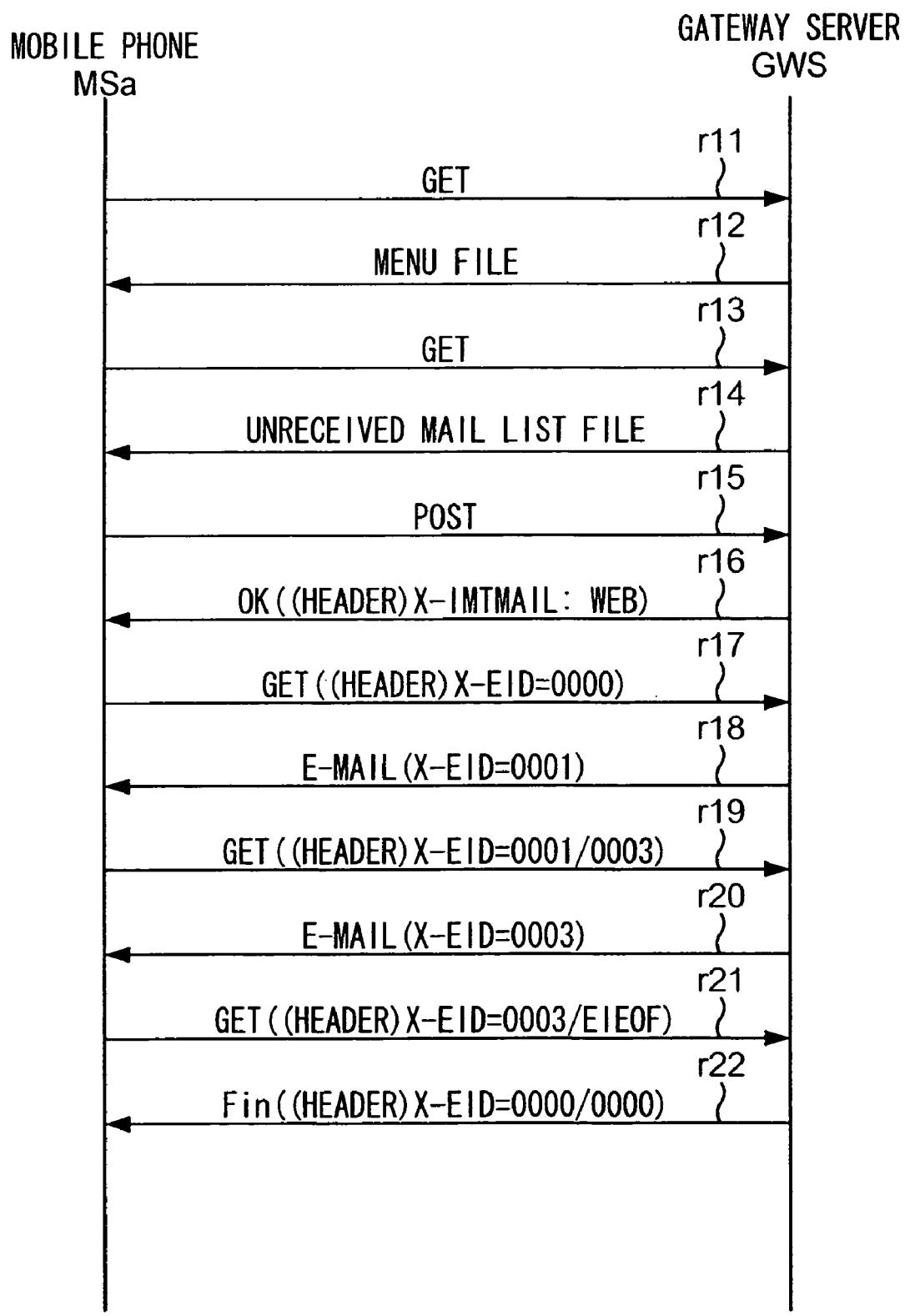
FIG. 6 is a sequence diagram showing an operation example in the system.

In FIG. 6, when a user inputs a URL (http://www.mpn-.co.jp/menu.html) for an HTTP file indicating a menu page in gateway server GWS, or selects an object associated with the concerned URL via an anchor tag for HTML, by using operation unit 17 in mobile device MSa, mobile device MSa generates an HTTP request r11 including the above URL as a parameter for a GET method. HTTP request r11 is received by gateway server GWS as shown in FIG. 6.

Gateway server GWS reads from hard disk 25 an HTML file (menu.html) designated by HTTP request r11, and generates an HTTP response r12 including a read HTML file. HTTP response r12 is transmitted from gateway server GWS and received by mobile device MSa.

Figure 7:
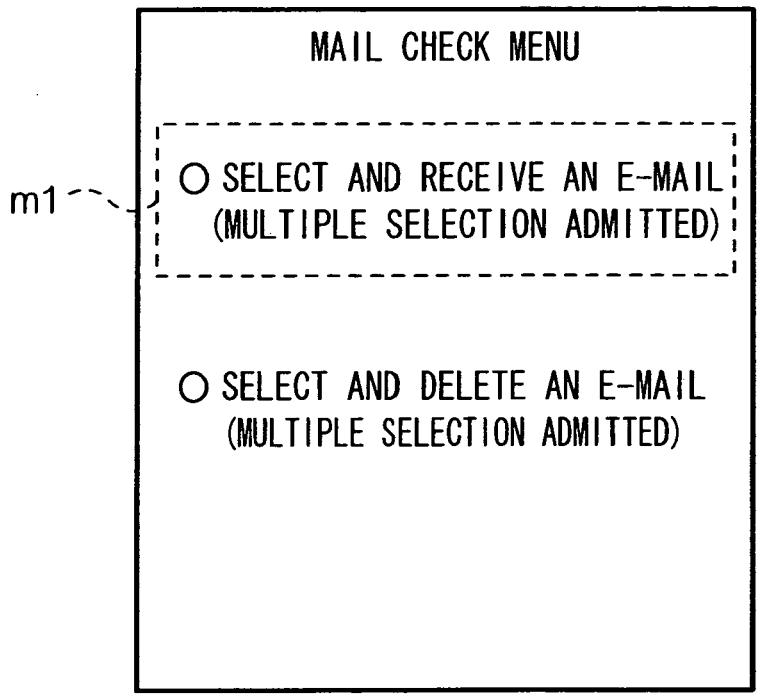
FIG. 7 is a pattern diagram showing a screen displayed on a mobile device in the operation example.

Mobile device MSa, for example, displays a menu page shown in FIG. 7 in compliance with the content in HTML file included in received HTTP response r12.

In FIG. 7, URL (http://www.mpn.co.jp/list09012345678.html) is correlated with a menu object m1 by an anchor tag using HTM; the menu object ml indicating "selecting and receiving an e-mail". The HTML file named http://www.mpn.co.jp/list09012345678.html is a file name for unreceived mail list file M1 corresponding to mobile device MSa.

When a user performs an operation to select menu object m1 in the menu page shown in FIG. 7, mobile device MSa generates a HTTP request r13 including the above URL as a parameter for a GET method. HTTP request r13 is sent from mobile device MSa, and received by gateway server GWS.

Gateway server GWS reads from hard disk 25, on the basis of received HTTP request r13, unreceived mail list file ML whose file name is list09012345678.html, and generates an HTTE response r14 including the above unreceived mail list file ML. HTTE response r14 is transmitted from gateway server GWS and is received by mobile device MSa.

Figure 8:
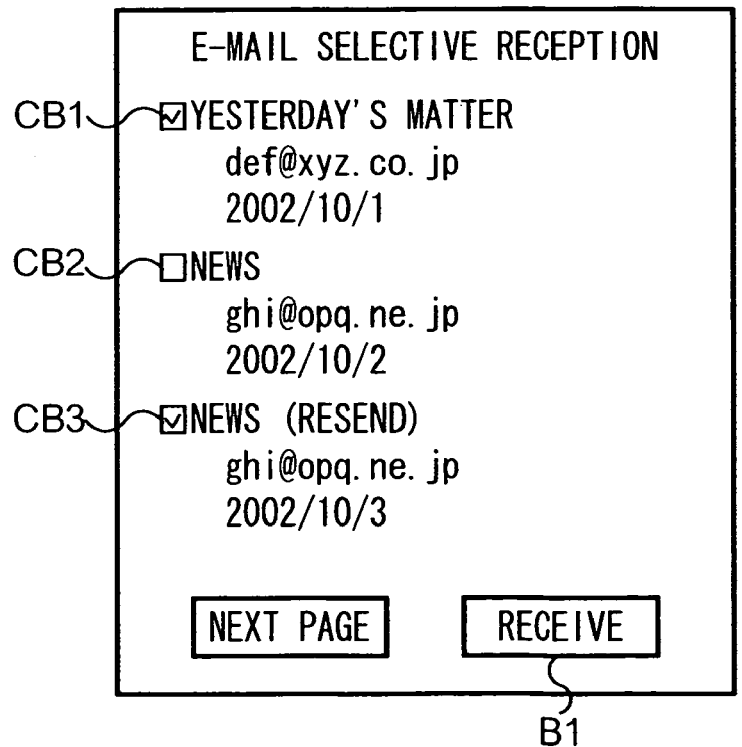
FIG. 8 is a pattern diagram showing a screen displayed on a mobile device in the operation example.

Mobile device MSa displays, for example, an unreceived mail list shown in FIG. 8 in compliance with the content in unreceived mail list file ML included in HTTE response r14.

As shown in FIG. 8, an e-mail title, a sender and transmission date and time, and check box C1 to C3 corresponding to each e-mail are included in unreceived mail list file ML displayed by mobile device MSa. Referring to an unreceived mail list, a user performs an operation for checking any of the check boxes CB1 to CB3 each corresponding to a desired e-mail by using operation unit 17. An unreceived mail list is to be returned to gateway server GWS by using a POST method. When a user selects and presses "reception" button B1 after checking a check box, mobile device MSa generates an HTTP request r15 of a POST method including a NAME attribute and a VALUE attribute for a check box selected by a user (in FIG. 8, check box CB1 and CB3). A NAME attribute and a VALUE attribute included in HTTP request r15 are used as identification information for identifying an e-mail desired by a user. HTTE request r15 is sent from mobile device Msa, and is received by gateway server GWS.

On the basis of a NAME attribute and a VALUE attribute included in received HTTE request r15 and an unreceived mail list corresponding to mobile device MSa, gateway server GWS stores in RAM 24 mail IDs of e-mails (in this case, mail ID 0001 and 0003) to be sent to mobile device MSa. Then, gateway server GWS reads from hard disk 25 an HTML file indicating a request accepting completion page, which indicates the acceptance of a request related to HTTP request r15 and generates HTTP response r16 including the read HTML file. HTTP response r16 is sent from gateway server GWS and is received by mobile device MSa.

Figures 9, 10, 11:
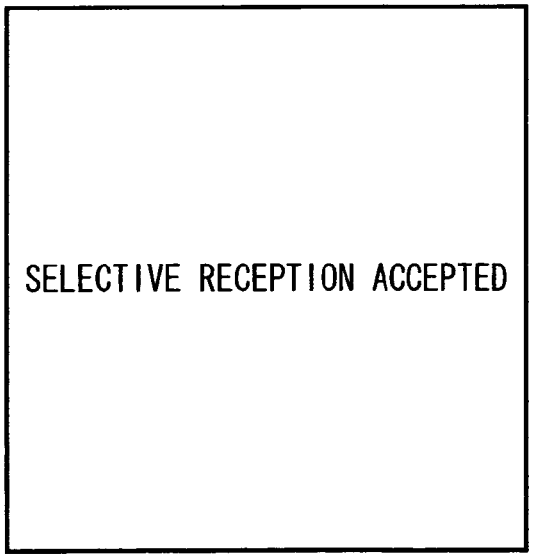
FIG. 9 is a diagram showing the contents of a HTTP response in the operation example.
FIG. 10 is a pattern diagram showing a screen displayed in a mobile device in the operation example.
FIG. 11 is a diagram showing the contents of a HTTP request in the operation example.

FIG. 9 is a diagram illustrating one example of HTTP response r16 in this case.

In FIG. 9, a status code (200 OK) included in an HTTP header indicates that a request, associated with HTTE request r15 from mobile device MSa, is successful. Further, since a field name (X-IMTMAIL) and a field value (WEB) are set to HTTP response r16, mobile device MSa which has received HTTP response r16 determines that a selected e-mail is to be sent by gateway server GWS, and mobile device MSa reads a mailer from ROM 13 for activation. Also, mobile device MSa interprets the content of an HTML file indicating a request accepting completion page (shown in FIG. 9) by executing a browser, and displays image data on display unit 16 shown in FIG. 10.

Then, mobile device MSa reads from EEPROM 15 a program name of a CGI program (in this case, "imt.cgi") installed in gateway server GWS, and generates an HTTE request r17 including a URL including the above program (http://www.mpn.co.jp/imt.cgi?) as a parameter for a GET method. HTTE request r17 is sent from mobile device MSa, and received by gateway server GWS.

FIG. 11 is a diagram explaining one of the examples of HTTE request r17. In FIG. 11, a mail ID of an e-mail, requested by mobile device MS to gateway server GWS, is written in a field value whose field name is (X-EID). Here, in a first request from mobile device MS to URL http://www.mpn.co.jp/imt.cgi?, it is determined that (0000) is set as a field value of a field name (X-EID). The field value (0000) indicates that a corresponding e-mail does not exist.

When gateway server GWS identifies that a field value corresponding to (X-EID) is (0000) by referring to received HTTE request r17, gateway server GWS determines that this is a first request from mobile device MS to URL http://www.mpn.co.jp/imt.cgi?. Next, gateway server GWS refers to stored mail IDs (0001) to (0003) on the basis of the above HTTE request r15. Then, gateway server GWS reads from mail box MB in hard disk 25 an e-mail corresponding to a telephone number (09012345678) and a mail ID (0001), and generates an HTTP response r18 including the e-mail. HTTP response r18 is sent from gateway server GWS, and received by mobile device MSa.

FIG. 12 is a diagram illustrating one example of HTTP response r18 in this case. In FIG. 12, (0001) in a field value (0001/0003) of a field name (X-EID) indicates a mail ID of an e-mail included in HTTP response r18, and (0003) indicates a mail ID of an e-mail to be sent next. Further, a field name (X-IMTMAIL) and a field value (WEB) are included in HTTP response r18, and the inclusion of field name (X-IMTMAIL) and a field value (WEB) indicates that an e-mail included in HTTP response r18 is to be stored in an e-mail storage area of EEEPROM15 in mobile device MS.

When mobile device MSa detects from received HTTP response r18 a field name (X-IMTMAIL) and a field value (WEB), a browser in mobile device MSa interprets the character strings (X-IMTMAIL and WEB), and determines that an e-mail is to be stored. Then, mobile device MSa extracts an email from HTTP response r18 by using a function of a mailer, and stores it in an e-mail storage area of EEEPROM15.

Then, to request a next e-mail, mobile device MSa generates an HTTP request r19 including a field value (0001/0003) of a field name (X-EID) included in HTTP response r18, and including URL http://www.mpn.co.jp/imt.cgi? as a parameter for a GET method. HTTP request r19 is sent from mobile device MSa, and received by gateway server GWS. FIG. 13 is a diagram explaining one of the examples of an HTTP request in this case. As shown in FIG. 13, (0001/0003) written in a header of HTTP response r18 is written as a field value of a field name (X-EID).

Gateway server GWS refers to a field value of (X-EID), that is to say, (0001/0003) written in a header of the received HTTP request r19, identifies the completion of transmission of an e-mail corresponding to a mail ID (0001), and next identifies that a mail ID of an e-mail to be sent is (0003). Then, gateway server GWS reads from mail box MB of hard disk 25, an e-mail corresponding to a telephone number (09012345678) and a mail ID (0003), and generates an HTTP response r20 including the corresponding e-mail. HTTP response r20 is sent from gateway server GWS, and received by mobile device MSa.

FIG. 14 is a diagram explaining one example of HTTP response r20. In FIG. 14, in a field value (0003/EIEOF) of field name (X-EID), (0003) indicates a mail ID of an e-mail included in HTTP response r20, and (EIEOF) indicates that a next e-mail to be sent does not exist.

Mobile device MSa extracts the received e-mail from HTTP response r20, and stores it in a mail storage area of EEPROM 15 in the same manner that mobile device MSa receives HTTP response r18. Then, mobile device MSa generates an HTTP request r21 including URL http://www.mpn.co.jp/imt.cgi? as a parameter of a GET method. HTTP request r21 is sent from mobile device MSa, and received by gateway server GWS. FIG. 15 is a diagram explaining an example of HTTP request r21. In FIG. 15, as a field value of a field name (X-EID), (0003/EIEOF) written in a header of an HTTP response is written directly in HTTP request r21.

When gateway server GWS identifies on the basis of the content of (0003/EIEOF) written in a header of HTTP request r21, that there is no e-mail to be sent next, gateway server GWS generates an HTTP response r22, and sends it to mobile device MSa. FIG. 16 is a diagram explaining one example of an HTTP response r22. In FIG. 16, a status code (251 Fin) indicates that a process is completed, and a field value (0000/0000) of a field name (X-EID) indicates that there is no e-mail to be sent.

When mobile device MSa receives HTTP response r22, mobile device MSa determines that a process is completed by referring to a status code and a field value (0000/0000) of a field name (X-EID), and displays a reception completion message shown in FIG. 17.

In FIG. 17, when a user selects a "YES" button, mobile device MSa reads from a mail storage area in EEPROM 15, an e-mail in order of receipt, and displays it.

According to the above mail transmission system, a user is able to select a desired e-mail by referring to an unreceived mail list because mobile device MS displays an unreceived mail list acquired from gateway server GWS by executing a browser. Then, mobile device MS notifies gateway server GWS of identification information of an e-mail to be selected by a user, and gateway server GWS sends to mobile device MS only an e-mail corresponding to identification information notified from mobile device MS. Therefore, no unwanted mails are sent to mobile device MS.

Further, prior to gateway server GWS sending e-mails to mobile device MS, gateway server GWS sends to mobile device MS, an HTTP header including the predetermined character strings referred to as a field name (X-IMTMAIL) and a field value (WEB), and mobile device MS prepares for receiving and storing e-mails from gateway server GWS by activating a mailer in response to the above transmission from gateway server GWS. Therefore, it is not necessary for a user to operate a mailer.

Further, a mail ID of the e-mail currently being sent, and a mail ID of an e-mail to be sent the next time, are written in a header of an HTTP response, in order of transmission. An e-mail sent from gateway server GWS is also included in a header of an HTTP response. On the other hand, mobile device MS writes in a header of an HTTP request, which requests an e-mail to be received by mobile device MS the next time, the above two mail IDs in the same order as the above transmission. Therefore, by only referring to a mail ID written in the received HTTP request, gateway server GWS is able to determine an e-mail that must be sent the next time on the basis of the above mail ID.

On the other hand, it is possible that gateway server GWS stores in RAM 24, a mail ID of an e-mail to be sent in a table format, and gateway server GWS gains an access to RAM 24 to refer to the above table at any time of receiving an HTTP request from mobile device MS, and determines the next e-mail to be sent. However, in this case, gateway server GWS does not only refer to the content of an HTTP request, but also gateway server GWS has to gain access to RAM 24, that is to say, the process to be followed by gateway server GWS becomes longer. Therefore, the above-described embodiment of the present invention is better because the process that gateway server GWS must follow is shorter.

Further, gateway server GWS sends e-mails to mobile device MS, along with an HTTP header including predetermined character strings, which are a field name (X-IMTMAIL) and a field value (WEB), then mobile device MS stores the received e-mails in EEPROM 15 by using a function of a mailer in response to the above transmission. Therefore, it is not necessary for users to instruct mobile device MS to store e-mails.

C. Modifications

As previously described, the present invention is not limited to the above embodiment, and the scope of the present invention is open to a variety of modifications.

(1) Mode of a Device Configuration

In the above embodiment, the system using mobile device MS as a mail client is described, but a mail client may be a fixed terminal such as a personal computer. Further, it is described that gateway server GWS, which performs data relay between mobile communication network MPN and Internet INETT, functions as a mail server for mobile device MS. However, it is obvious that it is for a mail server other than gateway server GWS can be used.

(2) Mode of Character Strings

Further, with regard to character strings for instructing mobile device MS to process data sent from gateway server GWS by using a function of a mailer, the character strings are (X-IMTMAIL: Field Name) and (WEB: Field Value) in the above embodiment. However, it is obvious that it is not necessary for the character strings to be limited to (X-IMTMAIL: Field Name) and (WEB: Field Value).

Further, in the above embodiment, the above character strings are included in HTTP response r16 (as shown in FIG. 6), and mobile device MS activates a mailer before receiving e-mails. However, it is also possible that the above character strings are not included in HTTP response r16, but included in HTTP response r18 sent from gateway server GWS to mobile device MS. In this case, mobile device MS which has received HTTP response r18 activates a mailer, and stores in an e-mail storage area of EEPROM 15, e-mails included in HTTP response r18.

(3) Mode of Using a Browser and a Mailer

In the above embodiment, mobile device MS continues executing a browser, and activates a mailer when receiving the above character strings, that is to say, mobile device MS executes these two programs simultaneously. However, mobile device MS may also finish executing a browser before activating a mailer at the time of receiving the above character strings.

(4) Mode of Providing Computer Programs

Computer programs for operating mobile device MS and gateway server GWS may be provided by recording the programs onto magnetic recording media recordable by CPU such as mobile device MS or gateway server GWS, or onto recording media such as optical recording media or ROM. Further, computer programs may be downloaded to mobile device MS or gateway server GWS through mobile communication network MPN or gateway server GWS.

(5) Mode of Using a Screen for Processing Mails

In the above embodiment, it is determined that mails are selected and received on a screen (as shown in FIG. 7), and it is determined which mail is to be received (as shown in FIG. 8). However, it is possible to combine the screens in FIG. 7 and FIG. 8 into one screen, and to designate at the same time which mail is received and deleted from a server, or which mail is stored in a server to be read later. This embodiment will be described below.

Figure 18:
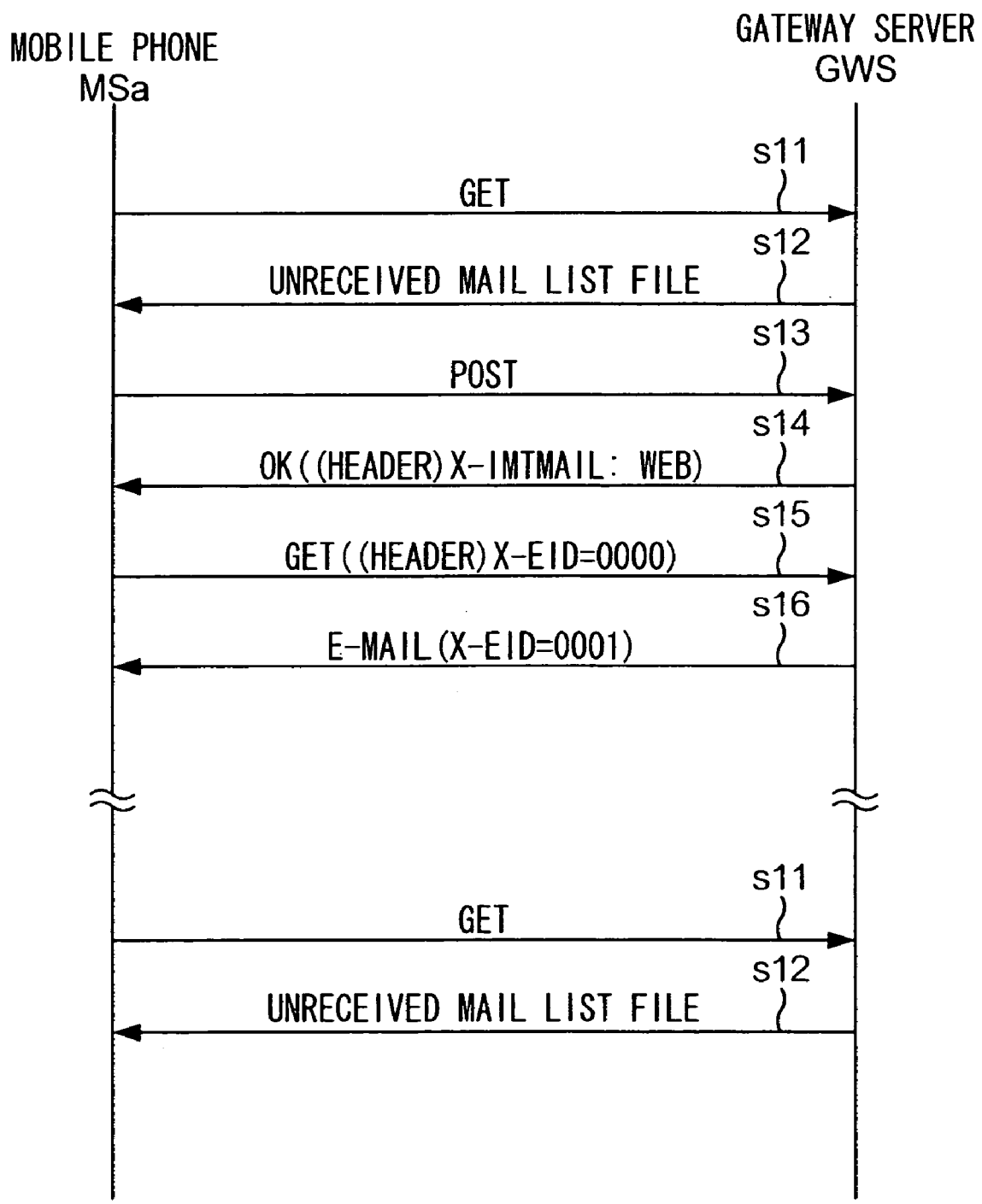
FIG. 18 is a sequence diagram illustrating an operation in one modification.

In FIG. 18, when a user inputs URL (http://www.mpn.co.jp/maillist090123456789.html) for an HTML file indicating an e-mail list page by using operation unit 17 in mobile device MSa, or when URL selects an object associated with an anchor tag of HTML, mobile device MSa generates HTTP request s11 including URL as a parameter of a GET method. As shown in FIG. 18, HTTP request s11 is sent from mobile device MSa, and received by gateway server GWS. Here, an HTML file referred to as (http://www.mpn.co.jp/maillist090123456789.html) is a file to be generated on the basis of unreceived mail list file ML of mobile device MSa, or unreceived mail list file ML.

Gateway server GWS reads from hard disk 25, an HTML file (http://www.mpn.co.jp/maillist090123456789.html) designated by HTTP request s11, and generates an HTTP response s12 including the read HTML file. HTTP response s12 is sent from gateway server GWS, and received by mobile device MSa.

Mobile device MSa displays an unreceived mail list, for example, as shown in FIG. 19, in compliance with the content written in an HTML file included in the received HTTP response s12.

As shown in FIG. 19, an e-mail title, a sender, a transmission date and time, and a pull down menu PM1 to PM3 corresponding to each mail are included in an unreceived mail list displayed by mobile device MSa. A user refers to the unreceived mail list, and selects a desired item by using pull down menu PM1 to PM3 corresponding to each mail using operation unit 17. This unreceived mail list is to be sent by using a POST method by a FORM tag of HTML. When a user presses an OK button C1 after selecting a desired item, mobile device MSa generates an HTTP request s13 of a POST method including a NAME attribute and a VALUE attribute on the basis of an item selected by a user. In FIG. 19, "Receive" is selected in pull down menu PM1, "Suspend" is selected in pull down menu PM2, and "Delete" is selected in pull down menu PM3, and HTTP request s13 is sent from mobile device MSa, and received by mobile device MSa.

By HTTP request s13, an e-mail to be received by a user, an e-mail to be suspended by a user, and an e-mail to be deleted by a user are determined. Then, an e-mail to be received by a user is sent from gateway server GWS to mobile device MSa in the same manner as described in the above embodiment, then an e-mail to be received by a user is deleted from mail box MB, in gateway server GWS, assigned to mobile device MSa, and from unreceived mail list file ML.

An e-mail to be suspended by a user remains in mail box MB, in gateway server GWS, assigned to mobile device MSa, and in unreceived mail list file ML. Further, an e-mail to be deleted by a user is deleted from mail box MB, in gateway server GWS, assigned to mobile device MSa, and from unreceived mail list file ML. Consequently, when the above process is completed, only an e-mail corresponding to PM2 in FIG. 19 remains in unreceived mail list file ML.

In this case, when HTTP request r11 and HTTP response r12 are sent and received between mobile device MSa and gateway server GWS, as shown in FIG. 20, only an e-mail corresponding to PM2 is displayed on a screen displayed in mobile device MSa.

The invention claimed is:

1. An e-mail processing method comprising:
sending, from a mail server for performing a mail delivery process to mail clients, mail attribute information indicating an attribute of an e-mail for the mail client in a data format, the data format enabling said mail client to display the mail attribute information by executing a document browsing program;
receiving, in the mail client, the mail attribute information transmitted from the mail server, and displaying the received mail attribute information in accordance with the document browsing program;
accepting, in the mail client, an operation to select an e-mail selected by a user from among e-mails corresponding to the displayed mail attribute information;
sending from the mail client to the mail server, identification information for identifying an e-mail selected by the user;
receiving in the mail server, the identification information transmitted from the mail client generating by the mail server at least one predetermined character string, the at least one predetermined character string being separate from the e-mail selected by the user and indicative of a command to the mail client to activate the e-mail processing program and store the e-mail transmitted by the mail server in a nonvolatile memory;

sending to the mail client a communication that includes a header comprising a field name and a field value and the at least one predetermined character string, wherein the at least one predetermined character string comprises a first value for the field name and a second value for the field value, the at least one predetermined character string for commanding the mail client to process data transmitted from the mail server to the mail client in accordance with an e-mail processing program, prior to or along with sending the e-mail specified by the identification information; and in response to receiving the at least one predetermined character string transmitted from the mail server, automatically activating the e-mail processing program and storing by the mail client in the nonvolatile memory the e-mail transmitted from the mail server, the nonvolatile memory being included in the mail client.

2. An e-mail delivery method according to claim 1, further comprising:

receiving, in the mail client, an instruction to suspend delivery from the mail server of an e-mail selected from among the displayed e-mails, and sending from the mail client identification information for specifying the selected e-mail to the mail server;

wherein the mail server receives identification information transmitted from the mail client, and in the next mail attribute sending step, sends mail attribute information of an e-mail whose delivery is to be suspended, the e-mail being specified by the identification information.

3. An e-mail delivering method according to claim 1, wherein the mail server and the mail client mutually send and receive data in accordance with a hyper text transfer protocol; and the predetermined character strings are written in a header of a hyper text transfer protocol.

4. An e-mail delivering method according to claim 1, wherein the mail server and the mail client mutually send and receive data in accordance with a hyper text transfer protocol; and the mail client, in the step of sending identification information, sends to the mail server identification information for specifying the selected e-mail by using a POST method of a hyper text transfer protocol.

5. An e-mail delivering method according to claim 1, wherein the mail server and the mail client mutually send and receive data in accordance with a hyper text transfer protocol; and when the mail server sends to the mail client the predetermined character strings prior to sending an e-mail identified by the identification information, the mail client requests the mail server to transmit the e-mail by transmitting a request to the mail server, the request using a GET method of a hyper text transfer protocol.

6. An e-mail delivering method according to claim 5, wherein when sending the e-mail to the mail client, the mail server writes in a header of a hyper text transfer protocol in a predetermined order identification information for identifying an e-mail to be transmitted this time, and identification information for identifying an e-mail to be transmitted subsequently and transmits them to the mail client; and the mail client writes in a request header of a hyper text transfer protocol in a predetermined order, the two pieces of identification information written in a header of the received hyper text transfer protocol, and requests the mail server to send the e-mail to be subsequently transmitted by transmitting a request header of a hyper text transfer protocol to the mail server; and the mail server identifies an e-mail to be sent on the basis of the predetermined order of the two pieces of identification information in a request header of the received hyper text transfer protocol, and sends the specified e-mail to the mail client.

7. An e-mail delivering method according to claim 1, wherein automatically activating the e-mail processing program comprises:

determining whether the e-mail processing program is activated; and activating the e-mail processing program if it is determined that the e-mail processing program is not activated.

8. An e-mail delivering method according to claim 1, wherein sending to the mail client the communication that includes the header comprising a field name and a field value and the at least one predetermined character string comprises:

sending a first communication from the mail server to the mail client acknowledging receipt of the identification information transmitted from the mail client, the first communication comprising the at least one predetermined character string; and sending a second communication from the mail server to the mail client containing the e-mail specified by the identification information, the second communication comprising the at least one predetermined character string.

9. A mail server for performing a mail delivering process to a mail client, the mail server comprising:

an attribute information sending unit configured to send to the mail client mail attribute information in a displayable data format enabling the mail client to indicate the e-mail attribute information in accordance with a document browsing program, the mail attribute information indicating an e-mail attribute for the mail client;

an identification information reception unit configured to receive identification information of an e-mail transmitted from the mail client;

a character string generating unit configured to generate at least one predetermined character string, the at least one predetermined character string being separate from the e-mail selected by the user; and a character string sending unit configured to send to the mail client, prior to or along with sending an e-mail specified by the identification information, a communication that includes a header comprising a field name and a field value and the at least one predetermined character string, wherein the at least one predetermined character string comprises a first value for the field name and a second value for the field value, the at least one predetermined character string for commanding the mail client to automatically activate an e-mail processing program and store in a nonvolatile memory the e-mail selected by the user.

10. A mail server according to claim 9, wherein the mail server is configured to send and receive data with the mail client in accordance with a hyper text transfer protocol; and the character string sending unit is configured to send the predetermined character strings to the mail client by writing the predetermined character strings in a header of a hyper text transfer protocol.

11. A mail server according to claim 9, wherein sending to the mail client the communication that includes the header comprising a field name and a field value and the at least one predetermined character string comprises:

sending a first communication from the mail server to the mail client acknowledging receipt of the identification information transmitted from the mail client, the first communication comprising the at least one predetermined character string; and sending a second communication from the mail server to the mail client containing the e-mail specified by the identification information, the second communication comprising the at least one predetermined character string.

* * * * *

UNITED STATES PATENT AND TRADEMARK OFFICE
CERTIFICATE OF CORRECTION

| | |
|---|---|
| PATENT NO. | : 7,640,321 B2 |
| APPLICATION NO. | : 10/519199 |
| DATED | : December 29, 2009 |
| INVENTOR(S) | : Yabe et al. |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 635 days.

Signed and Sealed this

Ninth Day of November, 2010

David J. Kappos
*Director of the United States Patent and Trademark Office*